United States Patent Office
2,888,461
Patented May 26, 1959

2,888,461
PRODUCTION OF TRIARYL 1,2,4-TRIAZOLES

Erwin Klingsberg, Mountainside, N.J., assignor to American Cyanamid Company, New York, N.Y., a corporation of Maine No Drawing. Application December 23, 1957
Serial No. 704,329

11 Claims. (Cl. 260—296)

The present invention relates to the preparation of triaryl 1,2,4-triazoles of the type:

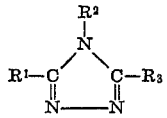

in which $R^1$, $R^2$ and $R^3$ are aromatic radicals. More specifically, it relates to a process of preparing 3,4,5-triaryl-1,2,4-triazoles by heating a diaroylhydrazine and an arylphosphazo compound above 135° in an inert solvent.

Such triazoles are known in the literature and in some cases their properties and utility have been described. For example, it is known that they are similar to strychnine in physiological action. Thus, these compounds, if an economical and convenient synthesis were available, would have great value as economic poisons for the extermination of undesirable animal life, including household and barnyard rodents and predators such as mice, rats, weasels, and the like.

No really suitable synthesis has ever been developed. It has been reported that an N,N'-diaroylhydrazine can be made to react with an aromatic amine to give a trisubstituted triazole, but the procedure has given low yields and has not been generally applicable. As a result, it has never been possible to make effective use of the valuable properties of these compounds.

I have found that a good yield of triaryl triazole can be obtained if the amine is first reacted with a phosphorus trihalide to give an aryl phosphazo compound, such as the halide:

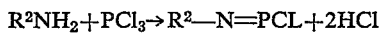

or the arylide:

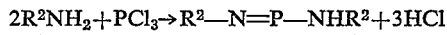

The phosphazo compounds are written in monomeric form, although the chemical literature indicates that a dimolecular ring structure may exist in some cases.

The phosphazo compound is then reacted with the diaroylhydrazine to give the 1,2,4-triazole. This reaction is widely applicable and is thus a practical method to get these compounds. The phosphorus trihalide can be either the chloride or bromide, though the chloride is usually preferred.

At least one or two moles of amine should be used to react with the phosphorus halide, although a large excess may also be used to advantage. For example, three additional moles of amine may be used to neutralize the hydrogen chloride liberated in the formation of a phenylphosphazo arylide, and even larger excesses do no harm. However, the use of an acid binding solvent such as quinoline or dimethylaniline dispenses with the need of this excess amine and in that case the minimum usage is possible. The reaction is broadly applicable to the great variety of primary aromatic amines that react with phosphorus trihalides to give arylphosphazo compounds, including aniline; the isomeric toluidines and xylidines and their homologs; halogenated derivatives such as p-bromoaniline and m-chloroaniline; p-aminobiphenyl; 2-aminofluorene; p-aminoazobenzene; anisidines and phenetidines; the naphthylamines and their substitution products; and heterocyclic amines such as 3-aminopyridine, 3-aminoquinoline, 7-aminoquinoline, thiophenine, and the like. These amines generally react readily and smoothly with the phosphorus trihalide at room temperature. A diluent may be advantageous. This can be a high-boiling organic liquid which is inert to the reactants, such as quinoline, carbitol ethyl ether, cellosolve butyl ether, N-methylmorpholine, anisole, dimethylaniline or tetrachloroethane. Aromatic hydrocarbons, such as cymene, and their halogenated derivatives, such as the chlorotoluenes and in particular, o-dichlorobenzene, are very advantageous diluents. The diluent should boil over 135° C. if it is to be used as the medium for the second step. Excess of the amine used to form the phosphazo compound can also be used as a solvent.

After completion of the reaction between the amine and the phosphorus halide, the product is allowed to react with the diaroylhydrazine of the formula:

$$R^1CONHNHCOR^3$$

in which $R^1$ and $R^3$ may be the same or different aromatic radicals. They may be derived, for example, from benzoic acid, the isomeric toluic and ethylbenzoic acids and their higher homologs, halogenated derivatives such as p-bromobenzoic acid and o-chlorobenzoic acid, the isomeric nitrobenzoic acid, p-dimethylaminobenzoic acid, the naphthoic acids and their substitution products, anthracenecarboxylic acids, and heterocyclic aromatic acids such as nicotinic acid, isonicotinic acid, thiophenecarboxylic acids, 6-quinolinecarboxylic acid, and the like.

Triazole formation proceeds smoothly at temperatures of about 150° C. or higher. A temperature of at least 135° C. is necessary. Refluxing o-dichlorobenzene (180°) is an advantageous medium. The reaction between an arylphosphazo arylide and a diaroylhydrazine may be formulated approximately as follows, although the form in which the phosphorus is eliminated is not certain:

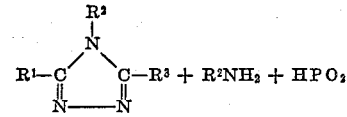

After completion of the reaction, which usually gives high yields, the triazole is isolated and purified by methods which are further described in the examples. For safety, large-scale preparations should have an inert atmosphere.

In some cases it may be advantageous to prepare the phosphazo compound in the presence of the diaroylhydrazine, triazole formation then being completed in situ in the normal manner.

The following examples illustrate the invention. Parts are by weight unless otherwise specified.

*Example 1*

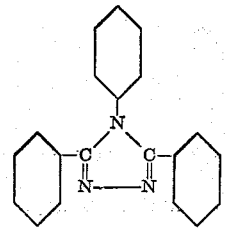

To a solution of 5.5 parts of aniline in 20–30 parts by volume of o-dichlorobenzene is gradually added 1.5 parts of phosphorus trichloride. After the reaction to form the phenylphosphazoanilide is complete, 2.4 parts of N,N'-dibenzoylhydrazine is added and the mixture is stirred and refluxed until triazole formation is complete. After cooling, the product is filtered and purified by digestion in hot water. The yield is more than 90% of theoretical. The product may be further purified by crystallization from acetic acid.

Example 2

The product of Example 1 may also be prepared as follows: A solution of 1.37 parts of phosphorus trichloride in 5 parts by volume of dimethylaniline is added with stirring to a solution of 1.0 part of aniline in 10 parts by volume of dimethylaniline to form phenylphosphazo chloride. After brief gentle heating, 2.4 parts of dibenzoylhydrazine is added and the mixture stirred at 190–200° C. for one to two hours or until the reaction is complete. The product is isolated by drowning in dilute acid and filtering.

Example 3

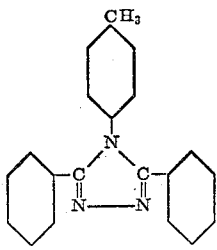

The procedure of Example 1 is followed, replacing the aniline by an equivalent amount of p-toluidine. A very good yield (over 85%) of product is obtained. It may be recrystallized from acetic acid.

Similarly, an equivalent amount of p-anisidine can be substituted for the aniline to give the triazole in which $R^2$ is p-anisyl.

Example 4

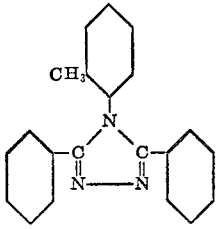

The procedure of Example 1 is followed, using an equivalent amount of o-toluidine instead of aniline. The product is isolated in the same way and may be purified by crystallization from dilute acetic acid or methylcyclohexane.

Example 5

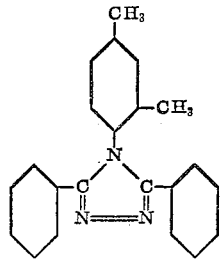

The procedure of Example 1 is followed, using an equivalent amount of m-xylidine instead of aniline. The product is worked up in the same way.

Example 6

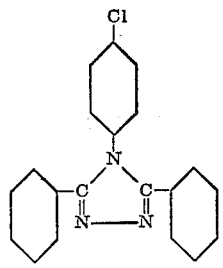

The procedure of Example 1 is followed, replacing the aniline by an equivalent quantity of p-chloroaniline. The product is obtained in a yield of over 85%.

Similarly, if the aniline is replaced by equivalent amounts of p-bromaniline or 3,5-dichloroaniline, the corresponding products are readily obtained.

Example 7

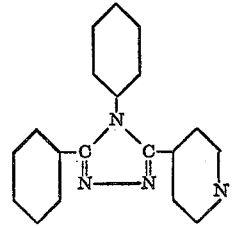

The procedure of Example 1 is followed, replacing the dibenzoylhydrazine by an equivalent amount of N-benzoyl-N'-isonicotinoylhydrazine. The product is obtained in very high yield, and may be crystallized from xylene.

The dibenzoylhydrazine can be similarly replaced with equivalent amounts of N-benzoyl-N'-2-thenoyl hydrazine, or N-picolinoyl-N'-6-quinolinoyl hydrazine, to give the corresponding triazoles.

Example 8

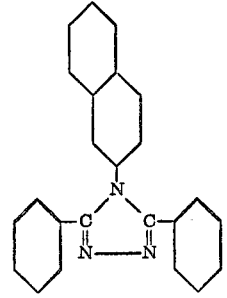

The procedure of Example 1 is followed, replacing the aniline by an equivalent amount of beta-naphthylamine. The product may be crystallized from dilute acetic acid or xylene. The aniline can also be replaced by an equivalent amount of 4-aminobiphenyl to give the corresponding 4-xenyl triazole.

Example 9

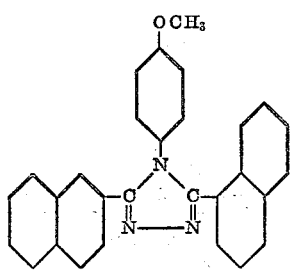

The procedure of Example 1 is followed, using equivalent quantities of N-α-naphthoyl-N'-β-naphthoyl hydrazine in place of the dibenzoylhydrazine, and p-anisidine in place of the aniline.

Example 10

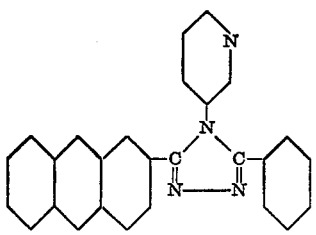

The procedure of Example 1 is followed using equivalent quantities of N-2-anthroyl-N'-benzoyl hydrazine in place of the dibenzoylhydrazine and 3-aminopyridine in place of the aniline.

Example 11

By the same procedure, the following diaroylhydrazine and phosphazo compounds react to give triazoles:

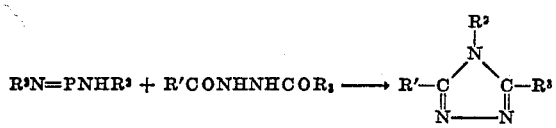

| R¹ | R² | R³ |
|---|---|---|
| phenyl. | phenyl. | p-chlorophenyl. |
| phenyl. | p-tolyl. | p-anisyl. |
| phenyl. | p-tolyl. | m-nitrophenyl. |
| p-tolyl. | 3-pyridyl. | p-tolyl. |
| 3-thienyl. | 2-naphthyl. | phenyl. |
| 2-thienyl. | 2-naphthyl. | 2-thienyl. |
| 2-thienyl. | p-chlorophenyl. | phenyl. |

Example 12

The procedure of Example 1 is followed except that the amount of o-dichlorobenzene is doubled and the dibenzoylhydrazine is added to the aniline solution before the phosphorus trichloride. The reaction mixture is worked up in the same manner to produce the same product.

I claim:

1. A process of preparing 3,4,5-trisubstituted-1,2,4-triazoles in which all substituents are aromatic radicals which comprises heating above 135° C. in an inert solvent a diacyl hydrazide in which each acyl group is an aromatic carboxy radical or less than four rings and an aromatic phosphazo compound of less than four rings.

2. The process of claim 1 in which the inert solvent is a chlorinated hydrocarbon.

3. The process of claim 2 in which the solvent is o-dichlorobenzene.

4. The process of claim 2 in which the solvent is dimethylaniline.

5. The process of claim 1 in which the arylphosphazo compound is an arylphosphazoarylide.

6. The process of claim 3 in which the arylphosphazo compound is an arylphosphazoarylide.

7. The process of claim 1 in which the arylphosphazo compound is an arylphosphazo chloride.

8. The process of claim 4 in which the arylphosphazo compound is an arylphosphazo chloride.

9. The process of claim 6 in which the arylphosphazoarylide is phenylphosphazoanilide.

10. The process of claim 9 in which the diaroylhydrazine is dibenzoylhydrazine.

11. A process according to claim 1 in which the arylphosphazo compound is prepared in the presence of the diaroylhydrazine.

No references cited.